(12) United States Patent
Lin

(10) Patent No.: US 9,151,911 B2
(45) Date of Patent: Oct. 6, 2015

(54) PHOTOELECTRIC COUPLING MODULE HAVING COVER

(71) Applicant: HON HAI PRECISION INDUSTRY CO., LTD., New Taipei (TW)

(72) Inventor: I-Thun Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 143 days.

(21) Appl. No.: 13/972,874

(22) Filed: Aug. 21, 2013

(65) Prior Publication Data

US 2014/0199023 A1    Jul. 17, 2014

(30) Foreign Application Priority Data

Jan. 17, 2013    (TW) .............................. 102101727 A

(51) Int. Cl.
G02B 6/42    (2006.01)
(52) U.S. Cl.
CPC ....................................... G02B 6/42 (2013.01)

(58) Field of Classification Search
CPC .................................... G02B 6/42; G02B 6/32
USPC ............................................................ 385/33
See application file for complete search history.

(56) References Cited

U.S. PATENT DOCUMENTS 7,025,511 B2 *   4/2006   Nakajima ........................ 385/93
7,118,293 B2 *  10/2006   Nagasaka et al. ............... 385/89

* cited by examiner

Primary Examiner — Akm Enayet Ullah
(74) Attorney, Agent, or Firm — Novak Druce Connolly Bove + Quigg LLP

(57) ABSTRACT

A photoelectric coupling module includes a holding module and a lens module. The holding module includes a base defining a receiving recess and a cover having a protruding portion. The protruding portion is received in the receiving recess, and the protruding portion and the receiving recess cooperatively define a receiving room for holding optical fibers. The lens module is coupled to the holding module, and includes a reflective surface, a plurality of first lenses, and a plurality of second lenses. Optical axes of the first lenses cross optical axes of the second lenses on the reflective surface. The optical fibers are coupled to the second lenses.

9 Claims, 3 Drawing Sheets

PHOTOELECTRIC COUPLING MODULE HAVING COVER

BACKGROUND

1. Technical Field

The present disclosure relates to photoelectric technologies and, particularly, to a photoelectric coupling module.

2. Description of Related Art

Photoelectric coupling modules generally include a holding module and a lens module coupling to the holding module. The holding module defines a number of through holes for holding optical fibers, and the lens module has a number of lenses for transmitting light rays emitted from the optical fibers. However, as the number of the optical fibers of the photoelectric coupling module increases, the holding module defines more through holes to hold the optical fibers. A spacing interval between adjacent through holes limits the number of the through holes.

Therefore, it is desirable to provide a photoelectric coupling module that can overcome the limitations described.

DETAILED DESCRIPTION

Embodiments of the disclosure will be described with reference to the drawings.

Figure 1:
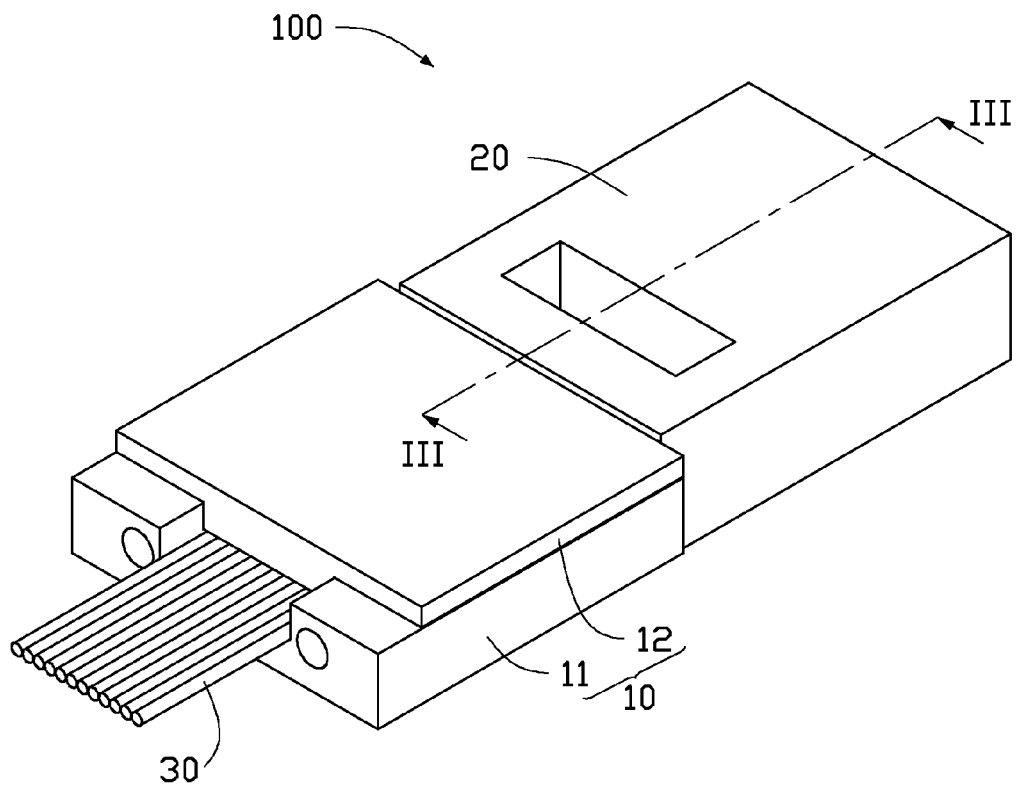
FIG. 1 is a schematic view of a photoelectric coupling module in accordance with an exemplary embodiment.
Figure 2:
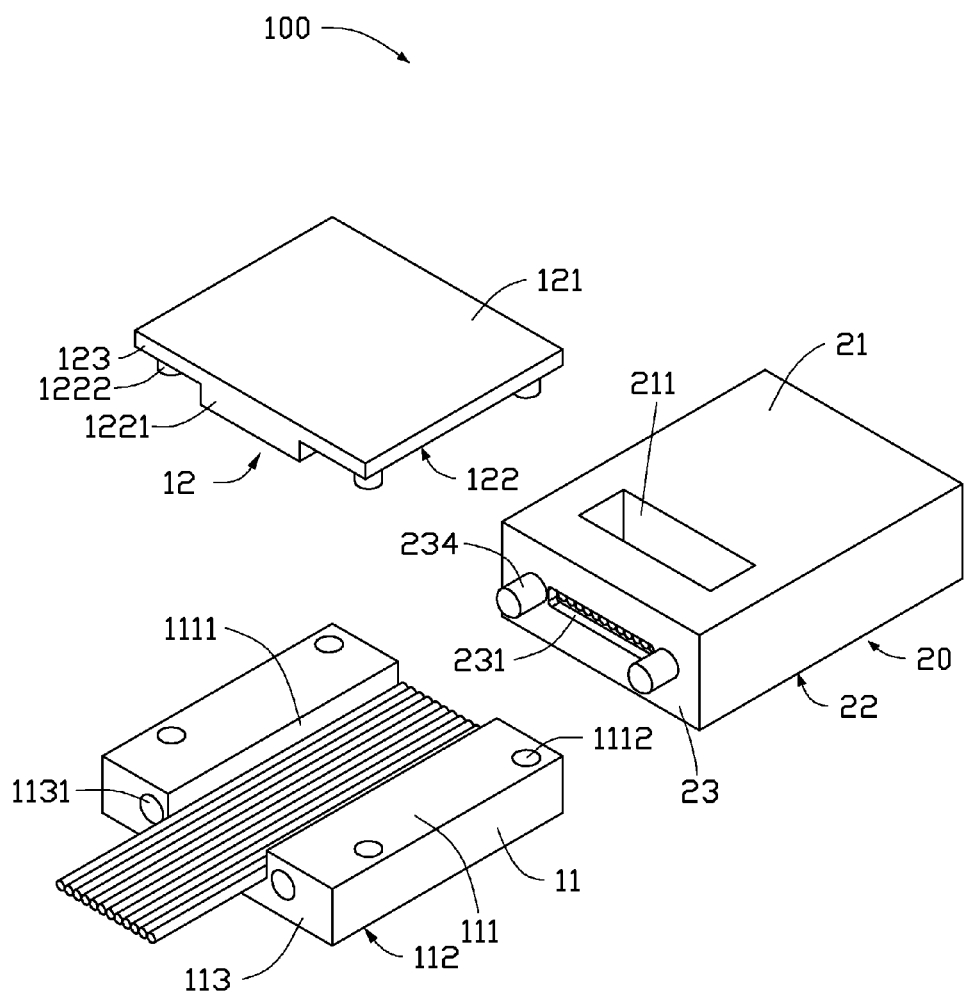
FIG. 2 is an isometric, exploded view of the photoelectric coupling module of FIG. 1.
Figure 3:
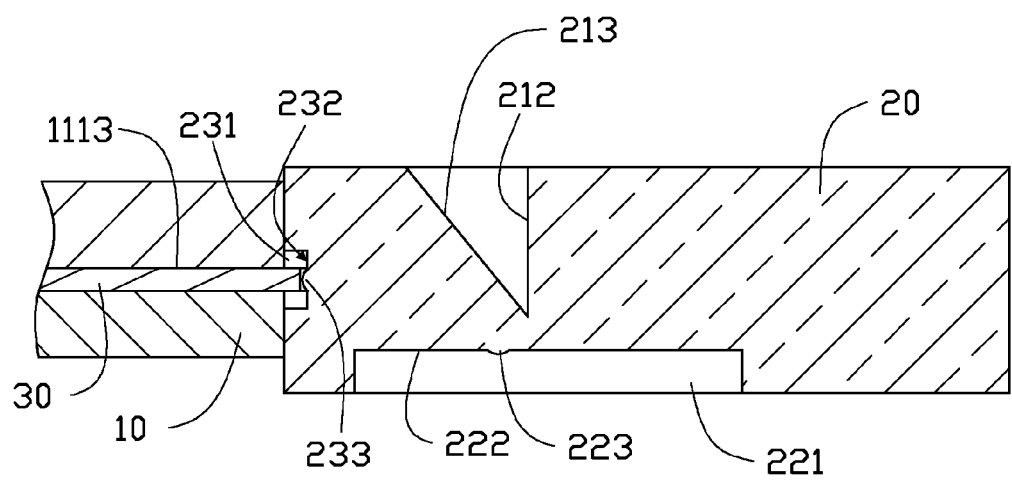
FIG. 3 is a cross-sectional view of the photoelectric coupling module taken along a line III-III of FIG. 1.

FIGS. 1-3 show a photoelectric coupling module 100 according to an exemplary embodiment. The photoelectric coupling module 100 includes a holding module 10 and a lens module 20 to be coupled with the holding module 10.

The holding module 10 is configured for holding optical fibers 30, and includes a base 11 and a cover 12. The base 11 is substantially rectangular and is made of transparent material, such as plastic or glass. The base 11 includes a first upper surface 111, a first lower surface 112, and two opposite first side surfaces 113. The first upper surface 111 is opposite to the first lower surface 112, and the two first side surfaces 113 are substantially perpendicularly connected between the first upper surface 111 and the first lower surface 112. The base 11 defines a receiving recess 1111 and a number of position holes 1112 in the first upper surface 111. The receiving recess 1111 runs through the two opposite first side surfaces 113. The base 11 defines at least one fixing hole 1131 in one of the first side surfaces 113.

In the embodiment, the receiving recess 1111 is generally adjacent to a center of the first upper surface 111. The base 11 includes four position holes 1112 and two fixing holes 1131. The position holes 1112 are generally positioned at four corners of the first upper surface 111. The fixing holes 1131 run through the two first side surfaces 113, and generally adjacent to two opposite side of the base 11.

The cover 12 includes a second upper surface 121, a second lower surface 122, and two opposite second side surfaces 123. The second lower surface 122 is opposite to the second upper surface 121, and the two second side surfaces 123 are substantially perpendicularly connected between the second upper surface 121 and the second lower surface 122. A protruding portion 1221 and a number of position poles 1222 extend downward from the second lower surface 122.

In the embodiment, two ends of the protruding portion 1221 are coplanar with the two second side surfaces 123. A width of the protruding portion 1221 extending along a direction parallel with the second side surfaces 123 is substantially equal to a width of the receiving recess 1111 extending along a direction parallel with the first side surfaces 113. A height of the protruding portion 122 is less than a depth of the receiving recess 1111. The cover 12 includes four position poles 1222, generally positioned at four corners of the second lower surface 122. The positions of the position poles 1222 correspond to the positions of the position holes 1112.

The lens module 20 is substantially rectangular and is made of transparent material, such as plastic or glass. The lens module 20 includes a top surface 21, a bottom surface 22, and a first coupling surface 23. The bottom surface 22 is opposite to the top surface 21, and the first coupling surface 23 is substantially perpendicularly connected between the top surface 21 and the bottom surface 22.

The lens module 20 defines an elongated first recess 211 in the top surface 21, and a cross-section of the first recess 211, taken along a direction that is substantially perpendicular to a lengthwise direction of the first recess 211, is V-shaped. The first recess 211 includes an inner surface 212 substantially perpendicular to the top surface 21 and a reflective surface 213 tilted about 45 degrees relative to the inner surface 212.

The lens module 20 defines a substantially rectangular second recess 221 in the bottom surface 22. The second recess 221 includes a second coupling surface 222 substantially parallel to the top surface 21. A number of first lenses 223 are formed on the second coupling surface 222, located within an orthogonal projection of the reflective surface 213 onto the bottom surface 22. In the embodiment, the first lenses 223 are convex lenses. The first lenses 223 are arranged in one line and face the reflective surface 213.

The lens module 20 defines a substantially rectangular third recess 231 in the first coupling surface 23. A width of the third recess 231 in a direction substantially perpendicular to the top surface 21 is equal to a diameter of an optical fiber 30. The third recess 231 includes a connecting surface 232 substantially parallel to the first coupling surface 23. A number of second lenses 233 are formed on the connecting surface 232, located within an orthogonal projection of the reflective surface 213 onto the connecting surface 232. In the embodiment, the second lenses 233 are convex lenses. The second lenses 233 are arranged in one line and face the reflective surface 213. At least one fixing pole 234 extends outward from the first coupling surface 23.

The number of the second lenses 233 is equal to the number of the first lenses 223. The second lenses 233 correspond to the first lenses 223. An optical axis of each second lens 233 is perpendicular to an optical axis of each first lens 223. The optical axes of the first lenses 223 cross the optical axes of the second lenses 233 on the reflective surface 213.

In the embodiment, the lens module 20 includes two fixing poles 234. The two fixing poles 234 are positioned at two sides of the third recess 231.

In assembly, the cover 12 is supported on the base 11, the first upper surface 111 is in contact with the second lower surface 122. The position poles 1222 are received in the position holes 1112, and the protruding portion 122 is received in the receiving recess 1111. The protruding portion 122 and the receiving recess 1111 define a receiving room 1113. The optical fibers 30 are received in the receiving room 1113. The optical fibers 30 are arranged in one plane in the receiving room 1113. The number of the optical fibers 30 is equal to the number of the first lenses 223 or the second lenses 233. The width of the receiving room 1113 is equal to a total diameter of all of the optical fibers 30. The holding module 10 is coupled to the lens module 20, one of the first side surfaces 113 is in contact with the first coupling surface 23. The fixing poles 234 are received in the fixing holes 1131. The optical fibers 30 received in the holding module 10 are aligned with the second lenses 233 of the lens module 20.

During the process of emitting the light rays, light emitters (not shown) emit light rays to the first lenses 223 along a direction perpendicular to the second coupling surface 222. The light rays are converged by the first lenses 223, and are projected onto the reflective surface 213. The reflective surface 213 reflects the light rays to the second lenses 233. The light rays are converged by the second lenses 233, and emitted to the optical fibers 30 held in the holding module 10.

During the process of receiving light rays, the light rays emitted from the optical fibers 30 enter into the lens module 20 through the second lenses 233. The light rays are converged by the second lenses 233, and are projected onto the reflective surface 213. The reflective surface 213 reflects the light rays to the first lenses 223. The light rays are converged by the first lenses 223, and are projected to the light receivers (not shown).

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A photoelectric coupling module, comprising:
    a holding module comprising a base defining a receiving recess and a cover comprising a protruding portion, the protruding portion received in the receiving recess, the protruding portion and the receiving recess cooperatively defining a receiving room for holding optical fibers; and
    a lens module coupling to the holding module, and comprising a reflective surface, a plurality of first lenses, and a plurality of second lenses; optical axes of the first lenses crossing optical axes of the second lenses on the reflective surface; the optical fibers coupling to the second lenses.

2. The photoelectric coupling module of claim 1, wherein a height of the protruding portion is less than a depth of the receiving recess.

3. The photoelectric coupling module of claim 1, wherein the base comprises a first upper surface, a first lower surface opposite to the first upper surface, and two opposite first side surfaces connected between the first upper surface and the first upper surface; the receiving recess is defined in the first upper surface, and extends through the two opposite first side surfaces.

4. The photoelectric coupling module of claim 2, wherein the cover comprises a second upper surface, a second lower surface opposite to the second upper surface, and two opposite second side surfaces connected between the second upper surface and the second lower surface; the protruding portion extends downward from the second lower surface.

5. The photoelectric coupling module of claim 4, wherein the first upper surface of the base is in contact with the second lower surface of the cover.

6. The photoelectric coupling module of claim 4, wherein the base defines a plurality of position holes in the first upper surface, and the cover comprises a plurality of position poles extending downward from the second lower surface, the position poles are received in the position holes.

7. The photoelectric coupling module of claim 4, wherein a width of the protruding portion in a direction parallel with the second side surfaces is substantially equal to a width of the receiving recess extending along a direction parallel with the first side surfaces.

8. The photoelectric coupling module of claim 1, wherein the number of the first lenses is equal to the number of the second lenses.

9. The photoelectric coupling module of claim 8, wherein the number of the optical fibers is equal to the number of the first lenses or the second lenses.

* * * * *